United States Patent [19]

Crivello

[11] Patent Number: 5,260,349
[45] Date of Patent: Nov. 9, 1993

[54] ELECTRON BEAM CURABLE EPOXY COMPOSITIONS

[75] Inventor: James V. Crivello, Clifton Park, N.Y.

[73] Assignee: Polyset Corporation, Mechanicville, N.Y.

[21] Appl. No.: 861,153

[22] Filed: Mar. 27, 1992

Related U.S. Application Data

[63] Continuation of Ser. No. 638,105, Jan. 4, 1991, abandoned.

[51] Int. Cl.$^5$ .................................................. C08F 2/46
[52] U.S. Cl. .................................... 522/31; 522/170; 522/911
[58] Field of Search ................... 522/170, 31, 911

[56] References Cited

U.S. PATENT DOCUMENTS

| | | | |
|---|---|---|---|
| 4,175,963 | 11/1979 | Crivello | 522/170 |
| 4,529,490 | 7/1985 | Crivello et al. | 522/31 |
| 4,654,379 | 3/1987 | Lapin | 522/15 |
| 4,657,844 | 4/1987 | Covington et al. | 430/325 |
| 4,849,320 | 7/1989 | Banks et al. | 430/280 |
| 4,977,199 | 12/1990 | Koleske et al. | 522/31 |
| 4,990,546 | 2/1991 | Eckberg | 522/31 |

OTHER PUBLICATIONS

ACS Symp. Ser. 417; Ch. 28; Crivello & Lee, 1990 UV Cure of Epoxy–Silicone Monomers.
New Synthesis of Aryl-Sub'd Sulfonium . . . Cationic Polymrztn. RPI and GE Co.; Akhtar, Crivello, Lee & Schmitt; Jul. 1990.
The Synth., Chrztn, and P-I Cationic Polymrztn of Si-Contng Epoxy Resins; GE R&D; Crivello & Lee; 1990.

Primary Examiner—Marion E. McCamish
Assistant Examiner—Mark A. Chapman
Attorney, Agent, or Firm—Schmeiser, Morelle & Watts

[57] ABSTRACT

Deep section epoxy compositions are cured by irradiation with e-beam, x-ray, or γ-ray radiation. Use of photoinitiators having metal halide anions makes monomers and oligomers especially susceptible of this invention's deep section curing technology.

10 Claims, No Drawings

ELECTRON BEAM CURABLE EPOXY COMPOSITIONS

This application is a continuation application of prior application Ser. No. 638,105, filed on Jan. 4, 1991, now abandoned.

BACKGROUND OF THE INVENTION

1. Field of the Invention

The invention relates, generally, to electron-beam (e-beam) cure of epoxy compositions and specifically to deep-section, e-beam cure of herein disclosed epoxy monomers.

2. Relevant Art Discussion

Today, the use of electron beam radiation to carry out the rapid, pollution free, low energy polymerization of multifunctional vinyl monomers is a well established technique. E-beam curing, as it is called, is most widely applied to the cure of coating materials which are either heavily pigmented or are comparatively thick in cross-section, such as cable insulation. In such applications, ultraviolet radiation-induced polymerization is impractical whereas the great depth of penetration of the electron radiation permits the polymerization of these substrates with relative ease. E-beam curing is most widely applied to multifunctional acrylate and methacrylate monomers and polymerization results by a free radical mechanism initiated by solvated electrons and free radicals produced by bond scission in the monomers. the use of multifunctional acrylate and methacrylate monomers for e-beam curing suffers from the fact that these materials are costly, toxic and require an inert atmosphere for their proper cure. For high speed applications, the cost of nitrogen used as an inert atmosphere may render this process economically disadvantageous. Acrylate and methacrylate based monomers also may not have the requisite properties to meet demanding applications. One such application lies in the area of composites fabrication. In this application, excellent thermal resistance, adhesion to the fiber reinforcements and superior mechanical properties of the cured resin is required. These properties have not been obtained using acrylate and methacrylate monomers.

There are also cases known in which the cationic polymerization of certain monomers can take place under the influence of electron beam radiation. These polymerizations, which proceed by the generation of cation-radicals and free ions (cations), require highly purified and dry monomers. For this reason, such polymerizations are not suitable for use in practical applications. Polymers bearing pendant epoxide groups have been used as negative tone electron beam photoresists. In this case only a few percent (1-5%) reaction of the epoxy groups is sufficient to effectively crosslink the resin.

Several workers have recently disclosed in patents the use of cationically polymerizable systems in e-beam curing. The first of these, Covington et al., U.S. Pat. No. 4,657,844, described the use of polyvinyl formal and polyvinyl carbazole, together with onium salts, as curable systems for microlithographic applications. In another patent, U.S. Pat. No. 4,654,379, Lapin describes the use of vinyl ethers in combination with cellulose esters to form interpenetrating network polymers at doses from 0.1 to 10 Mrads. Onium salts are also required in this technology. Still another patent, Banks et al., U.S. Pat. No. 4,849,320, describes the e-beam cure of mixtures of cationically and free radically curable resins in the presence of onium salts for microlithographic applications. Cycloaliphatic epoxides are mentioned in this patent.

Recently, the γ-ray and electron beam induced cationic polymerization of vinyl ether monomers and oligomers in the presence of reducible onium salt photoinitiators has been reported. While the e-beam induced cationic polymerization of vinyl ethers is interesting, the use of these materials would only be appropriate for rather low performance applications. Accordingly, my work has been focused on the e-beam polymerization of epoxy resins. Cured epoxy resins are well known for their excellent chemical resistance, mechanical properties and adhesion to various substrates. However, initial attempts to use e-beam irradiation for the polymerization of commercially available bisphenol-A diglycidyl ether monomers or the difunctional cycloaliphatic epoxide monomer, 3,4-epoxycyclohexylmethyl-3', 4'-epoxycyclohexane carboxylate, were disappointing. Polymerization occurred slowly in the presence of diaryliodonium and triarylsulfonium salts but only after massive radiation does (100-300 Mrad.) were applied. These radiation doses are too high for consideration for any practical application. However, it was determined that there would be considerable commercial and academic interest, if a means for curing epoxy resins using e-beam irradiation could be developed. Epoxy resins are currently used in many applications such as composites, where a combination of excellent high temperature and mechanical properties is essential. However, currently, no practical examples of e-beam curable epoxy monomers are known.

SUMMARY

Epoxy compositions are characterized by multifunctional cycloaliphatic epoxy monomers or polymers together with an onium salt initiator possessing metal halide anions. The epoxy compositions are cured by e-beam, x-ray and γ-ray irradiation methods. These compositions represent a breakthrough in epoxy resin technology and have major applications as coatings, inks, adhesives, composites, fiber optics, electronic packagings and photoresists for integrated circuits. Composites applications, in particular, represent a new and enormously important area for application of this technology.

DETAILED DESCRIPTION OF THE INVENTION

Two classes of exceptionally reactive epoxy monomers in photo (UV) initiated cationic polymerization have recently been indentified. Shown, following, are the structures of some of these monomers.

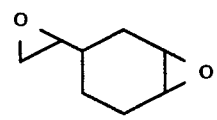

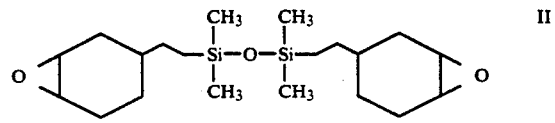

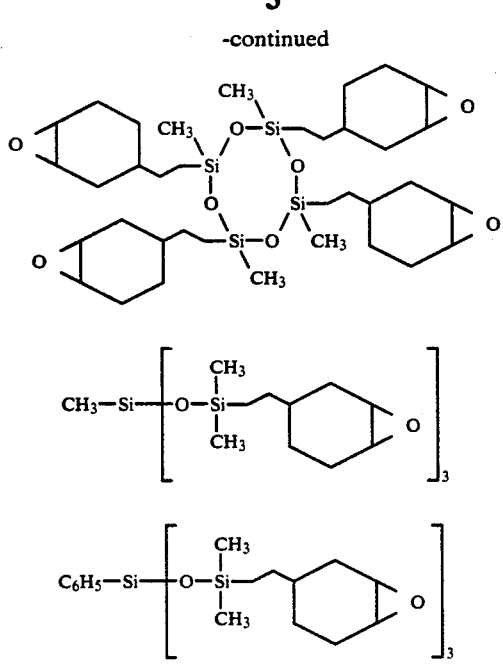

The polymerization of these monomers using UV and visible light requires the use of an onium salt photoinitiator. Typically, diazonium, diaryliodonium, triarylsulfonium, triarylselenonium, diaryliodonium, triarylsulfonium, triarylselenonium, diaryliodosonium, triarylsultoxonium, diarylbromonium, diarylohloronium and phenacylsulfonium salts can be used. Since the photoresponse of these monomers was so high, it was decided to employ these monomers in e-beam curing. Indeed, it was observed that such monomers underwent extremely facile polymerization on e-beam irradiation in the presence of the above mentioned onium salt photoinitiators at low does of 0.5-3 Mrad. Similar doses are currently being commercially employed for the e-beam cure of multifunctional acrylate and methacrylate monomers. These novel epoxy monomer-onium salt compositions require at least two orders of magnitude lower dose than the best formerly mentioned epoxy monomers and represent the first commercially viable e-beam curable epoxy systems. Moreover, these monomers offer extremely interesting mechanical, chemical and thermal properties.

EXPERIMENTAL

Materials

4-Vinylcyclohexene dioxide, I, was purchased from the Union Carbide Corp. and purified by fractional distillation prior to use. Silicone epoxides II-V were prepared as described in professional papers: Crivello, J. V.; Lee, J. L.; *J. Polym. Sci.*, Poly. Chem 1990, Vol. 28, 479-503 and Crivello, J. V. *Adv. in Polym. Sci.*, 1984, 62, 1. The synthesis of the photoinitiators; diphenyliodonium triphenylsulfonium, (4-octyloxyphenyl)-phenyliodonium and diphenyl(4-thiophenoxyphenyl)-sulfonium salts were carried out as described in: Crivello, J. V. and Lee, J. L.; *J. Polym.Sci.*, Poly. Chem. 1989, 27,3951-3965; Crivello, J. V. and Lam, J. H. W.; *Macromolecules*, 1977,10,1307-1315; and Akhtar,S. R.; Crivello, J. V.; Lee, J. L.; and Schmitt, M. L.; *Chem. of Mtls.*, 1990,2,732-737.

E-Beam Irradiation

Samples to be irradiated were coated onto 2 mil poly-(ethylene terephthalate) film using 1 and 3 mil drawknives. An Energy Sciences Electocurtain Model CB-150 electron beam irradiator operating at 165 KeV and equipped with a 15 cm linear cathode was used to irradiate the samples. The wet film samples were attached to a continuous web and passed through the beam. Experiments were run under nitrogen and air at a constant web speed. The dose was varied by changing the amperage applied to the filament.

Glass Transition Temperature Measurements

Tg measurements were made at 20° C./minute using a Perkin-Elmer DSC-7 Differential Scanning Calorimeter.

Shown, in Table 1 on the following page, are the results of one study using I as the monomer. In the studies conducted on this monomer and the other monomers described in this disclosure letter, an Electrocurtin Electron Beam apparatus supplied by Energy Sciences, Corp. Wilmington, MA was used operating at a voltage of 165 KeV. Samples were placed on a poly-(ethylene terephthalate) web operated at a fixed rate. The dosage received by the sample was varied by adjustment of the electrode amperage.

TABLE 1

| The E-Beam Polymerization of Monomer I* | | | |
|---|---|---|---|
| Initiator | Initiator Conc. (mole %) | Dose (Mrad) | Result |
| none | — | 2 | — |
| $Ph_2I^+ SbF_6^-$ | 0.5 | 2 | + |
| $Ph_2I^+ SbF_6^-$ | 0.25 | 2 | + |
| $Ph_2I^+ SbF_6^-$ | 0.25 | 1 | ± |
| $(4-C_8H_{17}OPh)PhI^+ SbF_6^-$ | 0.5 | 2 | + |
| $Ph_3S^+ SbF_6^-$ | 0.5 | 2 | + |
| $Ph_3S^+ AsF_6^-$ | 0.5 | 2 | — |
| $Ph_3S^+ PF_6^-$ | 0.5 | 2 | — |
| $Ph_3S^+ PF_6^-$ | 0.5 | 3 | — |
| $(4-PhSPh)Ph_2S^+ SbF_6^-$ | 0.5 | 2 | — |
| $(4-PhSPh)Ph_2S^+ SbF_6^-$ | -0.5 | 4 | ± |
| $(4-PhSPh)Ph_2S^+ SbF_6^-$ | 0.5 | 8 | + |

*Cured as 3 mil coatings on poly(ethylene terephthalate) films under nitrogen at ambient temperature (~25° C.).

Films of liquid monomer I containing the onium salt initiator indicated were irradiated at room temperature under a nitrogen atmosphere and then immediately tested after irradiation for their state of cure as indicated by their tackiness. In Table 1, and in subsequent tables, +indicates the film was tack-free while ±means slightly tacky, denoting partial cure and —means no cure. As Table 1 shows, monomer I undergoes facile e-beam induced cationic polymerization in the presence of diaryliodonium and triarylsulfonium $SbF_6$-salt photoinitiators. When these photoiniators are omitted, no polymerization occurs. Transparent, colorless films were obtained which were crosslinked and completely insoluble in all solvents. In the case of diphenyliodonium $SbF_6^-$, minimum dose rates as low as 1 Mrad were effective in initiating polymerization at photoinitiator concentrations of 0.5 mole percent; however, 2 Mrad consistently gave completely tack-free coatings. While successful e-beam polymerizations of monomer I occurred in the presence of diphenyliodonium $SbF_6^-$, (4-octyloxyphenyl)phenyliodonium $SbF_6^-$ and and triphenylsulfonium $SbF_6^-$salts, the corresponding photoinitiator, (4-thiophenoxyphenyl) diphenylsulfonium photoinitiator $SbF_6^-$, was less effective due to its poorer solubility in the monomer. Increasing the dose from 2 Mrad to 8 Mrad resulted in tack-free films with this photoinitiator.

As expected, there is a considerable effect on the rate of e-beam induced cationic polymerization of this epoxy monomer due to the nature of the counterion present in the onium salt photoinitiators. Comparing both diaryliodonium and triarylsulfonium initiators containing the $SbF_6^-$, $AsF_6^-$ and $PF_6^-$ anions in Table 1, it can be seen that those bearing the $SbF_6^-$ anion are the most effective.

Silicone-epoxy monomers are more reactive than simple epoxy monomers such as I in photoinitiated cationic polymerization using onium salts; and this was also observed in their e-beam cure. The minimum dose required to cure a 1 mil liquid film of difunctional silicone-epoxy monomer II on a glass substrate in nitrogen to a tack-free state using 0.5 mole % $(4-C_8H_{17}OPh)PhI^+SbF_6^-$ was determined and found to be 1 Mrad. Cured films of this polymerized monomer are transparent, colorless, hard and brittle. Using a dose of 2 Mrad, films 6 mil in thickness were cured.

In Table 2 is shown a study of the effects of photoinitiator structure, concentration, and dose on the e-beam cure of monomer II.

TABLE 2

The E-Beam Polymerization of Monomer II*

| Initiator | Initiator Conc. (mole %) | Dose (Mrad) | Result |
| --- | --- | --- | --- |
| none | — | 3 | — |
| $Ph_2I^+ SbF_6^-$ | 1.0 | 2 | + |
| $Ph_2I^+ SbF_6^-$ | 0.75 | 2 | + |
| $Ph_2I^+ SbF_6^-$ | 0.50 | 2 | + |
| $Ph_2I^+ SbF_6^-$ | 0.50 | 3 | + |
| $Ph_2I^+ SbF_6^-$ | 0.25 | 2 | + |
| $Ph_2I^+ SbF_6^-$ | 0.50 | 3 | — |
| $(4-C_8H_{17}OPh)PhI^+ SbF_6^-$ | 0.5 | 2 | + |
| $Ph_3S^+ AsF_6^-$ | 0.5 | 3 | ± |
| $Ph_3S^+ PF_6^-$ | 0.5 | 3 | — |
| $(4-PhSPh)Ph_2S^+ SbF_6^-$ | 0.5 | 3 | — |
| $(4-PhSPh)Ph_2S^+ PF_6^-$ | 0.5 | 3 | — |

*Cured as 3 mil coatings on poly(ethylene terephthalate) films under nitrogen at ambient temperature (~25° C.).

A 2 Mrad dose is sufficient to completely crosslink monomer II in the presence of as little as 0.25 mole % diphenyliodonium $SbF_6^-$. Again, polymerization was not observed when this monomer is irradiated in the absence of an onium salt initiator. The glass transition temperature (Tg) for this polymer was 181° C. The excellent high Tg is characteristic of cured epoxy silicone resins and is extremely important for their use in a wide variety of applications, but most particularly in composites.

Similarly, $(4-C_8H_{17}OPh)PhI^+$ $SbF_6^-$ and $(4-PhSPh)Ph_2S^+$ $SbF_6^-$ gave cured, crosslinked films at respectively, 2 and 3 Mrad doses. As was noted in the previous study involving monomer II, diaryliodonium salts and triarylsulfonium salts bearing the $SbF_6^-$ anion were much more effective as initiators than their analogs bearing the $AsF_6^-$ and $PF_6^-$ anions.

Results from the e-beam induced polymerization of cyclic and branched tri and tetrafunctional silicone epoxy monomers III IV and V given in Table 3

TABLE 3

The E-Beam Polymerization of Monomers III, IV and V*

| Monomer | Initiator # | Dose (Mrad) | Result | Tg |
| --- | --- | --- | --- | --- |
| II | none | 3 | — | |
| III | $Ph_2I^+ SbF_6^-$ | 2 | + | 190 |
| III | $Ph_3S^+ SbF_6^-$ | 2 | + | |
| III | $Ph_3S^+ SbF_6^-$ | 3 | + | |
| III | $(4-C_8H_{17}OPh)PhI^+ SbF_6^-$ | 2 | + | |
| III | $(4-PhSPh)Ph_2S^+ SbF_6^-$ | 2 | + | |
| IV | $Ph_2I^+ SbF_6^-$ | 2 | + | 176 |
| V | $Ph_2I^+ SbF_6^-$ | 3 | + | 185 |

*Cured as 3 mil coatings on poly(ethylene terephthalate) films under nitrogen at ambient temperature (~25° C.). # In all cases 0.5 mole % photoinitiator was used.

Like II, these monomers are highly reactive and underwent facile e-beam induced cationic polymerization in the presence of diaryliodonium and triarylsulfonium $SbF_6^-$ salt initiators and at low doses. Here again, very high Tg values are obtained using e-beam curing. Such Tg values are difficult to obtain using optimized thermal curing techniques employing conventional epoxy resins.

It has been reported that oxygen has a considerable effect on the e-beam induced cationic polymerization of vinyl ether monomers in the presence of onium salt photoinitiators. It seemed worthwhile, therefore, to attempt the e-beam polymerization of several of the monomers described in this disclosure in the presence of ambient air. The results of this study are shown in Table 4.

TABLE 4

The E-Beam Polymerization of Various Monomers in the Presence of Oxygen

| Monomer | Initiator Conc. (mole %) # | Dose (Mrad) | Result |
| --- | --- | --- | --- |
| I | 1.0 | 2 | + |
| II | 0.50 | 2 | + |
| II | 0.50 | 1 | + |
| II | 0.50 | 0.5 | ± |
| II | 0.25 | 2 | + |
| II | 0.25 | 1 | ± |
| III | 0.50 | 2 | + |

*Cured as 3 mil contains on poly(ethylene terephthalate) films in air at ambient temperature (~25° C.). #$Ph_2I^+ SbF_6^-$ Clearly, multifunctional epoxy monomers undergo facile e-beam induced cationic polymerization in the presence of oxygen. What is even more surprising and unexpected is that the dose requirements in the presence of oxygen are not substantially higher than under nitrogen. Approximately 0.5 Mrad is the limiting dose necessary for the cure of a 3 mil film of monomer II in the presence of 0.5 mole % of diphenyliodonium $SbF_6^-$. Alternatively, the limiting dose is 1 Mrad at an initiator concentration of 0.25%. This observation is unexpected and extremely interesting from a commercial point of view since, as mentioned before, the cost of maintaining an inert atmosphere over samples can contribute substantially to the overall cost of an e-beam cured coating.

The above examples demonstrate only a few of the many possible epoxy compositions which can be e-beam cured in the presence of onium salt initiators. For example, in addition to those monomers already noted above, cycloaliphatic epoxy monomers with the following structures can be used.

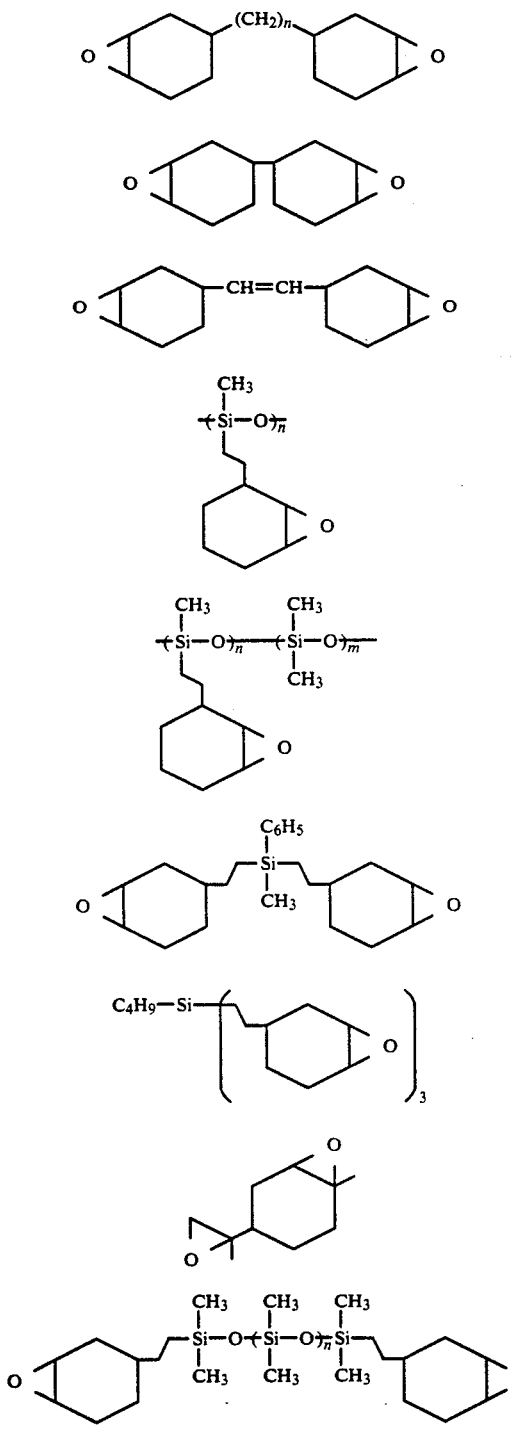

Similarly, the range of onium salts which can be applied to this invention is large and comprises diazonium, diaryliodonium, triarylsulfonium, triarylselenonium, diaryliodosonium, triarylsulfoxonium, diarylbromonium, diarylchloronium and phenacyldialkylsulfonium, benzyldialkylsulfonium and hydroxyphenyldialkylsulfonium salts. Among the above listed salts those bearing the $SbF_6^-$ anions are preferred.

Several sources of electron irradiation to accomplish curing may be employed. The most practical and widely used instrument is the electrocurtin apparatus which was used in the examples described in this disclosure. In this instrument, electrons from a heated linear cathode are accelerated under high electric potential onto the surface of the substrate. Other, similarly designed accelerators employ hot cathodes with accelerating and focusing magnets to deliver a highly penetrating beam of electrons. Alternatively, a Van de Graff accelerator which generates high energy electrons by classical electrostatic methods can be used. In addition, $\gamma$-irradiation from a $^{60}Co$ source can be used for curing. In this technique, fast electrons are generated by interaction of the $\gamma$-irradiation with the monomer. Still another technique involves focusing a high energy electron beam onto a heavy metal conversion target which converts the electrons to highly penetrating x-rays which can be used to achieve the desired cure.

Along with the above mentioned epoxy monomers and/or oligomers and onium salt photoinitiators, the e-beam curing compositions may also include a wide assortment of fibrous and particulate fillers, adhesion promoting agents, pigments, dyes and flating or leveling agents.

Applications

The novel e-beam curable epoxy monomers and oligomers can be applied to a wide diversity of applications. Among those which may be mentioned are decorative, protective and insulating coatings for wood, glass, metals and plastics, printing inks and adhesives. One recent application which is being considered is the use of e-beam curable inks for the rapid non-polluting printing of currency and stamps. Silicone epoxy monomers, in addition to being rapidly curing are non-toxic. Other monomers whose structures are also described in this disclosure should also be similarly non-toxic.

Since relatively thick cross section (also termed deep section) cures may be accomplished, these epoxides are useable for encapsulants and particularly, for composite applications. Among these are laminates, filament winding pultrusions and moldings. Various composite articles may be made by the herein discussed methodology with but a little further attention payed to the development of techniques to apply the monomers, oligomers and special initiators of the invention. For example, practically any shaped article is formed according to the various arts such as laminating, winding, etc., infused with, impregnated by or otherwise caused to become saturated with the aforementioned reactants and then subjected to the electron, x- or gamma irradiation necessary to effect the herein described cure states. In my experience, the e-beam cure of conventional epoxies was found to be too slow to be practical. Thus, the discovery described herein represents a breakthrough in composites fabrication.

Besides rapid curing, the monomers and oligomers described in this disclosure have the requisite high temperature properties (Tg's), as well as excellent solvent resistance and mechanical properties. Furthermore, the use of e-beam curing avoids the high temperatures and long times used in conventional composites fabrication and has the potential of greatly improving the mechanical properties of the final composite. This is achieved as a result of curing at room temperature which reduces the mechanical strain in the composites which results from a mismatch of the coefficients of thermal expansion between the matrix and the fiber reinforcements.

Additional to the previously described monomer/oligomer structures are those having a general form:

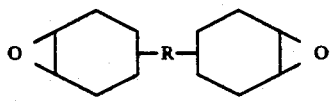

arylene, siloxane group or mixture of these.

Using a computer controlled scanning e-beam apparatus, the imagewise exposure of these epoxy monomers and oligomer systems can be achieved. Thus, such systems can be used as photoresists for such purposes as mask making and in the direct manufacture of patterned dielectric films for integrated circuits.

The above descriptions represent some but not all of the potential applications of this technology. In addition, many coating, adhesives and printing applications also exist for this technology. These applications shall become apparent by use of this teaching consistent with the appended claims.

What is claimed is:

1. A method for rapid, deep-section curing of reactive epoxy monomeric and/or oligomeric resins having mixed therewith an initiator susceptible of decomposition by ionizing radiation and comprised of an onium salt which bears metal halide anions, the method comprising the steps of:

first preparing a silicone-epoxy resin of highly reactive nature;

second preparing for curing the article in desired form an thickness using said silicone-epoxy resin that has been pre-mixed with at least one onium salt/metal halide initiator which will decompose upon exposure to low doses of ionizing radiation, said second preparing comprising the intermixing of said silicone-epoxy resin and initiator mixture with other substances, which include fibers and other composite fillers, and forming, after said intermixing, said silicone-epoxy resin, initiator and other sub stance mixtures into shapes ranging from film thicknesses up to deep section and lamina by using conventional molding, shaping, winding and laminating processes; and irradiating the article with electron, x-or gamma-ray radiation for a time sufficient to effectively induce rapid, deep-sectional polymerization of the resin by causing decomposition of the onium salt/metal halide initiator.

2. The method of claim 1 wherein the monomer and/or oligomer comprises at least one from a group monomers characterized by the following forms:

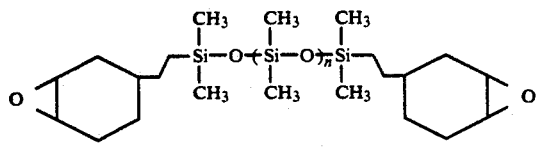

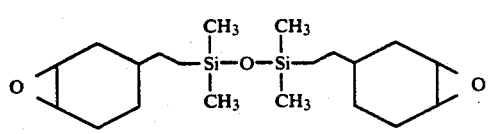

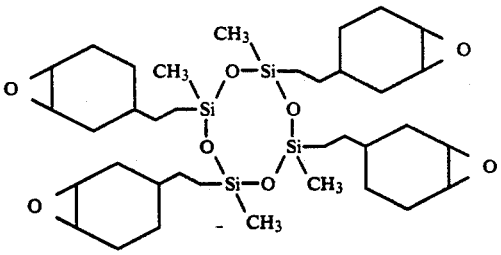

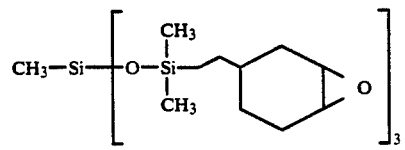

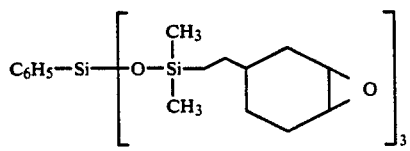

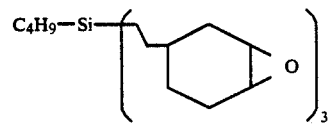

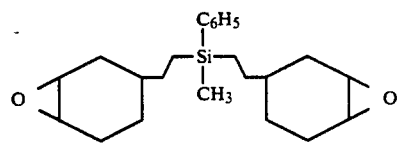

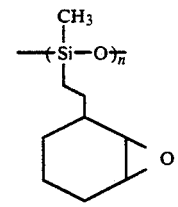

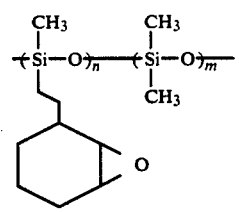

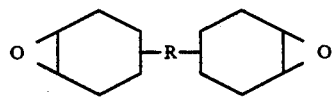

where R is a Si-containing moiety.

3. The method of claim 2 wherein the onium salt comprises at least one of the group characterized by diazonium, diaryliodonium, triarylsulfonium, triarylselenonium, diaryliodosonium, triarylsulfoxonium, diarylbromonium, diarylchloronium, phenacylsulfonium, phenacyldialkylsulfonium, benzyl-dialkylsulfonoum and hydroxyphenyldialkylsulfonium salts possessing metal halide anions.

4. The method of claim 3 wherein the metal halide anions comprise the group characterized by hexafluoride anions of Sb, As and P.

5. A method for preparation and unconventional rapid low dosage ionizing radiation cure of an article comprising reactive epoxy monomers, which method avoids purity and inert atmosphere requirements and comprises the steps of:

preparing a 0.25–1.0 M percent onium X⁻ salt-bearing, silicone-epoxy resin of the forms:

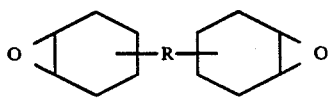

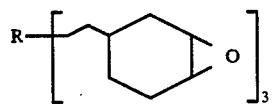

where X⁻ is a metal halide anion and R is a Si-containing moiety;

selecting at least one non-resin constituent for composite article fabrication;

fabricating an article of desired deep thickness and volume by constituting the article from the constituent and a silicone-epoxy resin of the preceding steps into a desired shape; and irradiating the article of the previous step by x-ray gamma or e-beam radiation at dosages between about 0.25 Mrad to about 8.0 Mrad.

6. The method of claim 5 wherein said constituent is pigment.

7. The method of claim 5 wherein the constituent is a fiber reinforcement or woven fabric.

8. The method of claim 5 wherein the constituent is glass.

9. An article of deep section made by the process of claim 5 and being at least in part essentially opaque, said article further comprising a non-resin constituent permeated throughout by a radiation cured reactive silicone-epoxy resin of any of the following forms:

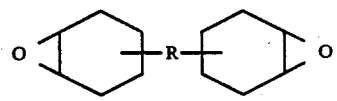

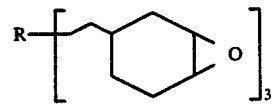

where R is an alkylene, arylene, siloxane group or mixture of these, and further, said silicone-epoxy resin includes at least one onium salt having a metal halide group.

10. The article of claim 9 wherein the silicone-epoxy resin is:

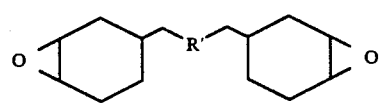 (a)

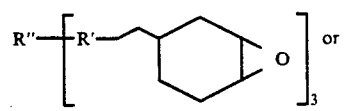 or (b)

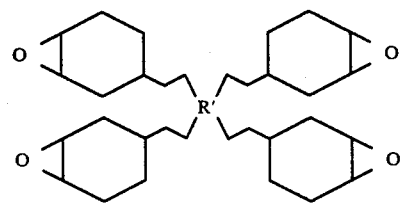 (c)

and R' is a Si-containing moiety, R" being any aliphatic-/aromatic.

* * * * *